United States Patent [19]

Spies et al.

[11] Patent Number: 4,696,999

[45] Date of Patent: Sep. 29, 1987

[54] PROCESS FOR THE PRODUCTION OF POLYBENZAMIDE WITH HALIDE CATALYST

[75] Inventors: Manfred Spies, Marburg; Peter Strohriegl, Hummeltal; Walter Heitz, Kirchhain, all of Fed. Rep. of Germany

[73] Assignee: Bayer Aktiengesellschaft, Leverkusen, Fed. Rep. of Germany

[21] Appl. No.: 829,766

[22] Filed: Feb. 14, 1986

[30] Foreign Application Priority Data

Feb. 21, 1985 [DE] Fed. Rep. of Germany ....... 3505903

[51] Int. Cl.[4] ............................................. C08G 69/08

[52] U.S. Cl. .................................... 528/319; 528/312; 528/320; 528/331

[58] Field of Search ................ 528/319, 320, 312, 331

[56] References Cited

U.S. PATENT DOCUMENTS 4,045,417  8/1977  Yamazaki et al. .................. 528/319

Primary Examiner—Harold D. Anderson
Attorney, Agent, or Firm—Connolly & Hutz

[57] ABSTRACT

The invention relates to a process for the production of polybenzamides from amino benzoic acids in the presence of metal halides.

3 Claims, No Drawings

PROCESS FOR THE PRODUCTION OF POLYBENZAMIDE WITH HALIDE CATALYST

This invention relates to a process for the production of polybenzamides from aminobenzoic acids in the presence of metal halides.

Polybenzamides are known. They are produced either by a multi-stage process (for example S. L. KWOLEK; Macromolecules 10, 1390-96 1977) or by using relatively expensive phosphorus compounds (for example N. YAMAZAKI, M. MATSUMOTO, F. HIGASI; Advances in Polymer Science 38, 1-25 (1981), F. HIGASHI, Y. AOKO, Y. TAGUCHI; Makrom. Chem; Rapid Commun. 2, 329-31, G. Wu, N. OGATI; Journ. Polym. Sci.: Polym. Letters Ed. 19, 343-45 (1981).

It has now been found that polybenzamides may be produced in a simple single stage process which also avoids the use of expensive phosphorus compounds if aminobenzoic acids are polycondensed in the presence of halides of elements from the 3rd and 4th main groups and the 4th secondary group of the Periodic Table of elements according to Mendeleyev (Hofman Rüdorff, Anorganische Chemie, page 97, 19th edition, 1966, published by Vieweg, Braunschweig).

The present invention accordingly relates to a process for the production of polybenzamides by polycondensation of aminobenzoic acids corresponding to general formulae (Ia) and/or (Ib).

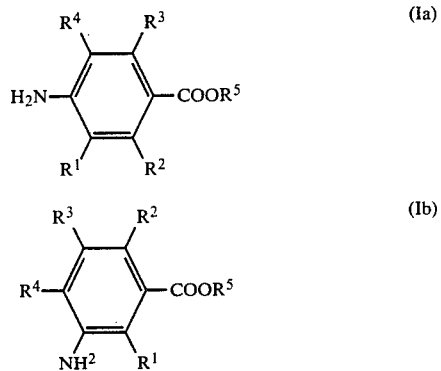

in which
$R^1$ to $R^4$ represent hydrogen, $C_1$-$C_{20}$ alkyl, $C_5$-$C_{10}$ cycloalkyl, $C_6$-$C_{14}$ aryl or $C_7$-$C_{20}$ aralkyl which may be linked to the aromatic moiety directly or via O, N, P or S; or halogen;
and
$R^5$ represents $C_1$-$C_8$ alkyl, $C_5$-$C_{10}$ cycloalkyl, $C_6$-$C_{14}$ aryl, $C_7$-$C_{15}$ aralkyl or hydrogen,
characterised in that polymerisation is carried out in the presence of halides of elements from the 3rd and 4th main group and the 4th secondary group of the Periodic Table.

The process according to the present invention is carried out in one step and without using phosphorus compounds.

Mixtures of polybenzamides and oxides of the elements are obtained during the reaction. These mixtures may be further processed directly. The properties of these materials may be varied by mixed oxide formation.

Separation of the oxides is also possible. It may either be effected, for example in the case of $TiO_2$, by dissolution of the polymer in N-methyl pyrrolidone/LiCl, filtration of the $TiO_2$ and precipitation of the polyamide or, for example in the case of $B_2O_3$, by dissolution of the reaction mixture in concentrated sulphuric acid and precipitation in water.

Fluorides, chlorides, bromides and iodides, preferably chlorides of elements in the 3rd (B, Al, Ga) and 4th main group (Si, Ge) as well as the 4th secondary group (Ti, Zr) of the Periodic Table, preferably $BCl_3$, $AlCl_3$, $GeCl_4$, $TiCl_4$ and $ZrCl_4$ may be used as the halides. They may be used individually or in a mixture provided that $SiCl_4$ is only used in a mixture.

From 0.5 to 2 mol, preferably from 0.5 to 1 mol of halide are used per mol of aminobenzoic acid.

The reaction is carried out at a temperature of from 60° to 250° C., preferably from 100° to 220° C. The reaction may optionally be carried out under an excess pressure of up to 10 bar.

The reaction may be carried out in a suitable solvent, for example in a tertiary aromatic nitrogen heterocycle such as pyridine, picoline, lutidine, quinoline and isoquinoline and in conventional known solvents for aromatic polyamides, for example N-methylpyrrolidone, HMPT, N,N-dimethylacetamide, optionally with addition of lithium or calcium salts. Mixtures of such solvents and mixtures of such solvents with solvents which are inert under the reaction conditions such as halogenated hydrocarbons, for example chlorobenzene and aliphatic hydrocarbons, such as decane, may also be used.

The choice of temperature may be made depending on the solvent. It may be necessary to apply pressure when using temperatures above the boiling point of the solvent.

The reaction according to the present invention may be illustrated by the following reaction equations:

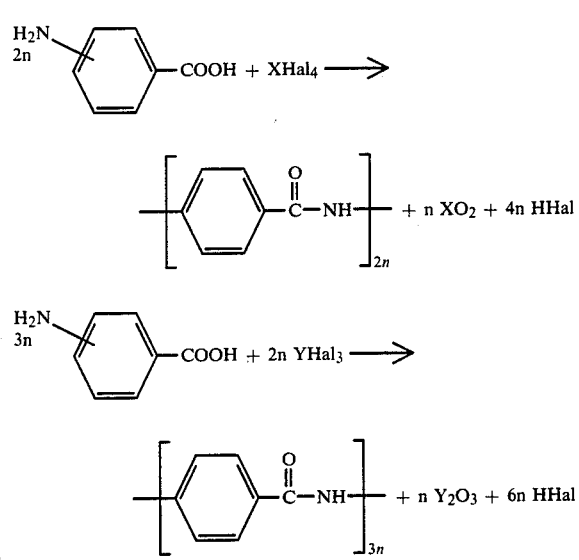

in which
Y represents an element of the 3rd main group and
X represents an element of the 4th main group or the 4th secondary group.

The reaction leads to polyamides having degrees of polymerisation of from 2 to about 400, preferably from 5 to about 200.

The regulation of the molecular weight may be effected by the molar ratio of aminobenzoic acid to halide used in each case. The molecular weights achieved are determined using the inherent viscosities measured at 30° C. in solutions of 0.05 g of polyamide in 100 ml of concentrated sulphuric acid.

The polyamides obtained according to the present invention may be processed in known manner into films and fibres.

Solutions of the polybenzamides prepared according to the invention in suitable solvents (e.g. $H_2SO_4$, LiCl/dimethyl acetamide) exhibit, inter alia, anisotropic properties. These properties can be used advantageously, for example in the production of orientated fibres or films. Owing to their high temperature resistance and stability at temperatures of up to about 300° C. and their modulus values (e.g. tear resistance) the fibres can be processed, for example, into composites which can for example be used in fields of application which cause, for example, a high degree of wear by extreme strain on the material (e.g. aircraft construction). In such fields they have superior properties to known fibres (e.g. Kevlar ® fibres).

The polybenzamides prepared by the process according to the invention can furthermore be processed, for example, into pulps. These pulps consist of a short fibre material with high stability values. The polybenzamides prepared by the process according to the invention can contain the oxides of the metal halides used as catalyst. In this case the metal oxide is finely distributed in the pulp during precipitation and can thus serve as an active or inert filler which has a favourable influence on the properties of the pulp (e.g. temperature resistance, coefficient of friction etc.).

Thus, $SiO_2$-containing polybenzamides can be resolved (when using $SiCl_4$ as a catalyst in the production of the polybenzamides), the $SiO_2$ then being suspended in the solution. From this solution containing suspended $SiO_2$, $SiO_2$-containing fibres and films can for example be produced from which carrier boards for, for example, printed circuits can be produced. The fibres can preferably be processed into non-woven fabrics, conveyor belts, woven fabrics and temperature-resistant garments, which are also suitable as insulating garments. The insulating properties of the fabrics produced from such fibres make them particularly suitable for uses under extreme temperatures (e.g. fire brigade outfits, space swits, deep-freeze clothing etc.).

EXAMPLE A

Condensation of 4-aminobenzoic acid with $TiCl_4$ 6.24 g of 4-aminobenzoic acid are dissolved in 60 ml of dry pyridine in a heated 100 ml three-neck flask with KPG stirrer, reflux condenser and septum. 4 ml of titanium tetrachloride are added at −15° C. and the mixture is then refluxed for 20 hours. The reaction mixture is worked up by stirring it in 500 ml of 2N HCL and the residue is suction filtered and thoroughly washed with $Na_2CO_3$ solution, water and acetone. 4.31 g of a mixture of poly-(1,4-benzamide) and titanium dioxide are obtained after drying.

This mixture is introduced into 200 ml of N,N-dimethylacetamide/8 g LiCl, is heated and the titanium dioxide is subsequently suction filtered. The poly-(1,4-benzamide) is precipitated in acetone.

Yield: 3.61 g=67%
Inherent viscosity: 0.14.

EXAMPLE B

Condensation of 4-aminobenzoic acid with $BCl_3$ 4.68 g of 4-aminobenzoic acid are dissolved in a heated 100 ml three-necked flask with KPG stirrer, reflux condenser and gas supply pipe in 50 ml of dry N-methyl pyrrolidone. 3.2 g of boron trichloride are co-condensed at −10° C. and the mixture is then heated for 20 hours at 165° C. The product is suction filtered, washed with hot water and THF and dried. Boric acid remaining in the product is removed by dissolving and reprecipitating from concentrated sulphuric acid in water.

Yield: 3.06 g=75%
Inherent viscosity: 0.25.

EXAMPLE C

Condensation of 4-aminobenzoic acid with $SiCl_4/TiCl_4$ 6.46 g of 4-aminobenzoic acid are dissolved in a heated 100 ml three-necked flask with KPG stirrer, reflux condenser and septum in 60 ml of pyridine. 2.7 ml of $SiCl_4$ and 0.52 ml of $TiCl_4$ are added at −10° C. and the mixture is then refluxed for 20 hours.

To work up the reaction mixture, it is introduced into 500 ml of 2N HCl, and the residue is suction filtered and thoroughly washed with $Na_2CO_3$ solution and with water and acetone.

8.2 g of a mixture of poly-(1,4-benzamide), silicon dioxide and titanium oxide are obtained after drying.

This mixture is introduced into 300 ml of N,N-dimethylacetamide/12 g of LiCl, is heated and the silicon dioxide or titanium dioxide is subsequently suction filtered. The poly-(1,4-benzamide) is precipitated with acetone/water.

Yield: 3.77 g=68%
Inherent viscosity: 0.51.

We claim:

1. A process for the production of a polybenzamide comprising polycondensation of aminobenzoic acid corresponding to formula (Ia) or (Ib) or a mixture of both

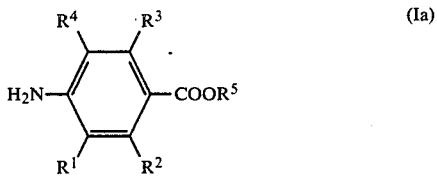

(Ia)

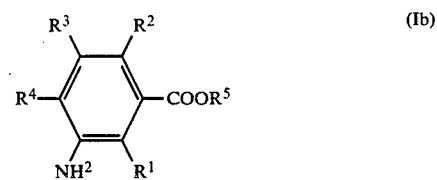

(Ib)

in which $R^1$ to $R^4$ represent halogen, hydrogen, $C_1$–$C_{20}$ alkyl, $C_5$–$C_{10}$ cycloalkyl, $C_6$–$C_{14}$ aryl or $C_7$–$C_{20}$ aralkyl linked to the benzene ring directly or via O, N, P or S; and $R^5$ represents $C_1$–$C_8$ alkyl, $C_5$–$C_{10}$ cycloalkyl, $C_6$–$C_{14}$ aryl, $C_7$–$C_{15}$ aralkyl or hydrogen, wherein the polycondensation is conducted in the presence of at least one halide of an element from the 3rd or 4th main group or the 4th secondary group of the Periodic Table of the elements according to Mendeleyev.

2. A process according to claim 1 wherein the halide comprises a mixture of halides.

3. A process according to claim 1 wherein polycondensation is conducted in an aromatic heterocyclic nitrogen base solvent.

* * * * *